United States Patent Office 3,349,780
Patented Oct. 31, 1967

3,349,780
ACETATE FILTER ELEMENTS CONTAINING CARBON
Bobby J. Sublett and George P. Touey, Kingsport, Tenn., assignors to Eastman Kodak Company, Rochester, N.Y., a corporation of New Jersey
No Drawing. Filed Nov. 4, 1964, Ser. No. 408,747
3 Claims. (Cl. 131—266)

ABSTRACT OF THE DISCLOSURE

A tobacco smoke filter of continuous, crimped cellulose ester filaments which carries an inpregnation of activated carbon of a mesh size between 8 mesh and 100 mesh, and a thermoplastic polymer constituted of a poly(oxy-ethylene glycol) of a molecular weight from about 50,000 to 6,000,000 and which softens above about 50° C. The fused poly(oxyethylene glycol) serves as the bonding means for securing the carbon to the cellulose ester filament.

This invention involves compact vapor-permeable rod-like fibrous elements. More particularly it relates to tobacco smoke filter elements containing activated carbon granules bonded to crimped cellulose acetate tow.

The use of activated carbon in cigarette filters to remove certain undesirable components from tobacco smoke has been taught by co-inventor Touey in U.S. Patents 2,881,770 and 3,043,736. Although filter rods containing carbon as taught by these patents have proved highly successful commercially, some filter manufacturers have expressed an interest in rods from which the carbon would not sift out to any appreciable extent. Therefore development of a commercially acceptable filter element with minimum tendency to lose its carbon additive represents a highly desirable result. After extended investigation we have developed such a rod having the desired pleasing appearance as well as tendency to retain carbon additive.

One object of this invention is to provide a filter element containing bonded carbon. Another object is to provide method of bonding activated carbon to a cellulose acetate filter rod so as to substantially prevent sifting out of carbon. Further objects will appear hereinafter.

In its broader aspects our invention involves mechanically blending activated carbon particles with particles of a thermoplastic polymer, adding the blend to an opened cellulose acetate tow and heating either the tow or the finished filter rod from the tow to tackify the thermoplastic particles and thereby fuse the carbon particles to the fibers of the filter. Total amount of additive is preferably about 10 to 40% by weight of the finished rod.

Thermoplastic particles which have been found especially useful according to our invention are of polyoxyethylene glycols, that is, solid polymers of ethylene oxide which have molecular weights ranging from 50,000 to 6,000,000 or more and which soften about 50° C. The preferred waxy polyoxyethylene glycols useful in our invention have molecular weights ranging from about 200,000 to about 4,000,000. The poly(oxyethylene glycol) particles may be within the range of 10 to 300 mesh, the preferred size being 50 to 200 mesh.

Carbon useful according to our invention includes that derived from wood, petroleum, shell (such as coconut or pecan shell), coal, blood, bone, or the like. It preferably should be of a particle size such that it will not pass through a 100-mesh screen (U.S.S. Sieve) but will pass through an 8-mesh screen. Most effective carbon particle size is from 20 to 60 mesh.

The carbon and the poly(oxyethylene glycol) may be blended to give a mixture containing 5 to 50% by weight poly(oxyethylene glycol). Such a mixture preferably contains 10 to 25% by weight poly(oxyethylene glycol).

According to our invention the carbon and poly(oxyethylene glycol) may be added separately or in admixture to bloomed or opened cellulose acetate tow. The tow is then heated to between 50 and 150° C. to soften the poly(oxyethylene glycol) particles and make them adhesive before it is wrapped to form the filter rods. Instead of heating the tow, the filter rods may be heated for softening the poly(oxyethylene glycol) particles. Thus the tow or rods may be placed in a suitable heating device and heated at from 50 to 150° C. for from 1 to 30 minutes. After bonding of carbon by heat treatment, the rods may be cut to desired lengths for filter use.

Example I 1125 mg. of 12×30 mesh coconut carbon granules were thoroughly mixed with 281 mg. of finely-divided poly(oxyethylene glycol) having an average molecular weight of 200,000. The mixture was then shaken onto a 150-mm. length of a 5 den./fil. crimped cellulose acetate tow which had 6,000 filaments and which had been spread out to a width of 15 inches. The tow was then heated to 100° C. for 5 minutes before it was wrapped with a paper tape to form a filter rod with a circumference of 25 mm. The rod was cut into 10-mm. segments which contained approximately 75 mg. of carbon and 19 mg. of the thermoplastic polymer.

The 10-mm. filter rods were attached to king-size cigarettes by means of a cellophane tape. The cigarettes were then smoked with an automatic smoking device. The vapor which passed through the filters was collected and analyzed by gas chromatography. The amounts of several components of the collected gas are listed in Table 1 below. The amount of the same components found in unfiltered smoke are also listed in Table 1 for comparison.

TABLE 1

| Component | $\mu$g. Found in Unfiltered Smoke From One Cigarette | $\mu$g. Found in Filtered Smoke From One Cigarette |
|---|---|---|
| Acetaldehyde | 800 | 240 |
| Propionaldehyde | 40 | 12 |
| Acrolein | 85 | 21 |
| Methanol | 120 | 36 |
| Methyl ethyl ketone | 75 | 22 |
| Isoprene | 600 | 180 |

Several of the filters were opened and examined. It was observed that the carbon particles were tightly bonded to the cellulose acetate fibers. None of the particles sifted out of the filters when they were tapped on a hard surface.

Example II 1650 mg. of 20×50 mesh petroleum carbon granules were thoroughly mixed with 550 mg. of powdered poly(oxyethylene glycol) with an average molecular weight of 1,000,000. The mixture was then dusted onto a 150-mm. length of crimped cellulose acetate filter tow (5 den./fil.—3,700 filaments) which had been opened to a width of 15 inches. The tow was bundled and wrapped with a paper tube to form a filter rod. The rod was heated at 70° C. for 8 minutes and then cooled to room temperature. It was cut into 10-mm. segments which contained approximately 110 mg. of carbon. The carbon did not sift out of filters made in this manner. The 10-mm. segments were attached to a king-size cigarette by means of a cellophane tape. The cigarette was then smoked with an automatic smoking device. The vapor which passed through the filter was collected and analyzed by gas chromatography. The amounts of several components of the collected gas are listed in Table 2, which follows.

The amounts of the same components found in unfiltered smoke are listed for comparison.

TABLE 2

| Component | μg. Found in Unfiltered Smoke From One Cigarette | μg. Found in Filtered Smoke From One Cigarette |
|---|---|---|
| Acetaldehyde | 800 | 200 |
| Propionaldehyde | 40 | 10 |
| Acrolein | 85 | 9 |
| Methanol | 120 | 40 |
| Methyl ethyl ketone | 75 | 15 |
| Isoprene | 600 | 150 |

*Example III*

810 mg. of 30×60 mesh carbon granules derived from wood were mixed with 145 mg. of a finely-divided poly(oxyethylene glycol) of 150,000 average molecular weight. The mixture was spread onto a 150-mm. length of crimped cellulose acetate filter tow (1.6 den./fil.—20,000 filaments) 15 inches wide. The tow was bundled and wrapped with a paper tape to form a filter rod. The rod was then heated in an oven at 90° C. for 5 minutes. The rod was cooled to room temperature and cut into 10-mm. segments which contained approximately 54 mg. of carbon. The carbon did not sift from the filter made in this manner, and microscopic observation revealed the filaments of cellulose acetate bonded to the carbon. The 10-mm. segments were attached to a king-size cigarette with a cellophane tape. The cigarette was then smoked with an automatic smoking device. The vapor which passed through the filter was collected and analyzed by gas chromatography. The amounts of several components of the collected gas are listed in following Table 3. The amounts of the same components found in unfiltered smoke are also listed.

TABLE 3

| Component | μg. Found in Unfiltered Smoke From One Cigarette | μg. Found in Filtered Smoke From One Cigarette |
|---|---|---|
| Acetaldehyde | 800 | 560 |
| Propionaldehyde | 40 | 20 |
| Acrolein | 85 | 42 |
| Methanol | 120 | 72 |
| Methyl ethyl ketone | 75 | 45 |
| Isoprene | 600 | 360 |

From the preceding description and examples it may be seen that we have provided a rod-like vapor-permeable fibrous element with carbon bonded thereto in such a manner that it does not readily sift out or cause undesirable discoloration.

Although the invention has been described in considerable detail with particular reference to certain preferred embodiments thereof, variations and modifications can be effected within the spirit and scope of the invention as described hereinabove, and as defined in the appended claims.

We claim:

1. A tobacco smoke filter element consisting of a bundle of continuous, longitudinally aligned crimped cellulose ester filaments carrying on their surfaces activated carbon particles preponderantly of a mesh size between 8 mesh and 100 mesh, the said activated carbon particles being bonded to the surfaces of the filaments by a fused thermoplastic polymer, said polymer being a poly(oxy-ethylene glycol) having a molecular weight from about 50,000 to about 6,000,000 and softening above about 50° C.

2. The filter of claim 1 in which the poly(oxy-ethylene glycol) of 50,000 to 6,000,000 molecular weight amounts to 5 to 50 parts of the polymer-carbon content.

3. The filter of claim 2 in which the total amount of poly(oxy-ethylene glycol) and carbon constitutes from about 10 to about 41% by weight of the composite filter.

References Cited

UNITED STATES PATENTS

| 2,904,050 | 9/1959 | Kiefer et al. | 131—266 X |
| 3,032,445 | 5/1962 | Hamon | 131—265 X |
| 3,039,908 | 6/1962 | Parmele | 131—266 |
| 3,101,723 | 8/1963 | Seligman et al. | 131—266 |
| 3,217,715 | 11/1965 | Berger et al. | 131—265 X |
| 3,227,791 | 1/1966 | Kiefer et al. | 131—266 X |

FOREIGN PATENTS 757,841   9/1956   Great Britain.

SAMUEL KOREN, *Primary Examiner.*

MELVIN D. REIN, *Examiner.*